US010768635B2

(12) United States Patent
Cha et al.

(10) Patent No.: US 10,768,635 B2
(45) Date of Patent: Sep. 8, 2020

(54) HYBRID ELECTRIC VEHICLE AND PLATOONING CONTROL METHOD THEREFOR

(71) Applicants: Hyundai Motor Company, Seoul (KR); Kia Motors Corporation, Seoul (KR)

(72) Inventors: Jung Min Cha, Gyeonggi-do (KR); Joon Young Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 149 days.

(21) Appl. No.: 16/204,701

(22) Filed: Nov. 29, 2018

(65) Prior Publication Data
US 2019/0179335 A1    Jun. 13, 2019

(30) Foreign Application Priority Data
Dec. 7, 2017   (KR) .......................... 10-2017-0167259

(51) Int. Cl.
| G05D 1/02 | (2020.01) |
| G05D 1/00 | (2006.01) |
| G08G 1/00 | (2006.01) |
| B60W 30/16 | (2020.01) |
| B60W 20/00 | (2016.01) |
| B60K 6/20 | (2007.10) |

(52) U.S. Cl.
CPC .......... *G05D 1/0289* (2013.01); *B60W 30/16* (2013.01); *G05D 1/0005* (2013.01); *G08G 1/22* (2013.01); *B60K 6/20* (2013.01); *B60W 20/00* (2013.01); *B60Y 2200/92* (2013.01); *G05D 2201/0213* (2013.01)

(58) Field of Classification Search
CPC ...... G05D 1/02; G05D 1/0289; G05D 1/0005; B60W 30/16; B60W 30/20; B60W 20/00; G08G 1/22
USPC .......................................................... 701/22
See application file for complete search history.

(56) References Cited

U.S. PATENT DOCUMENTS

| 10,520,581 | B2* | 12/2019 | Schuh ................... G01S 13/931 |
| 10,520,952 | B1* | 12/2019 | Luckevich .......... B60W 30/165 |
| 2013/0124064 | A1* | 5/2013 | Nemoto ................ B60W 30/16 701/96 |
| 2016/0358477 | A1* | 12/2016 | Ansari ............... G06Q 30/0251 |
| 2017/0168503 | A1* | 6/2017 | Amla ................... G05D 1/0011 |

* cited by examiner

*Primary Examiner* — Tan Q Nguyen
(74) *Attorney, Agent, or Firm* — Mintz Levin Cohn Ferris Glovsky and Popeo, P.C.; Peter F. Corless

(57) ABSTRACT

A hybrid electric vehicle is capable of maximizing energy efficiency during platooning, and a platooning control method is carried out on the hybrid electric vehicle. The method includes acquiring acceleration information and deceleration information of each of a plurality of vehicles traveling in a platoon form for platooning so as to realize a pulse-and-gliding traveling mode, determining a traveling order of the vehicles during the platooning based on the acceleration information, and determining a time at which to start a glide phase of a following vehicle in the determined traveling order based on a time at which a glide phase of a preceding vehicle starts using the acceleration information and the deceleration information.

19 Claims, 8 Drawing Sheets

HYBRID ELECTRIC VEHICLE AND PLATOONING CONTROL METHOD THEREFOR

This application claims under 35 U.S.C. § 119(a) the benefit of Korean Patent Application No. 10-2017-0167259, filed on Dec. 7, 2017, the entire contents of which are incorporated by reference herein.

BACKGROUND

(a) Technical Field

The present disclosure relates to a hybrid electric vehicle and a platooning control method, more particularly, to the hybrid electric vehicle capable of maximizing energy efficiency during platooning and a method of controlling the same.

(b) Description of the Related Art

Recently, with continued demand for improvement of fuel efficiency of vehicles and stringent regulations on emissions from vehicles in many countries, the demand for environmentally friendly vehicles such as hybrid electric vehicles (HEVs) and plug-in hybrid electric vehicles (PHEVs) has increased.

A hybrid electric vehicle utilizes two power sources including an engine and a motor. In the case of harmonious operation of the engine and the motor, optimal output and torque may be generated. Particularly, in the case of a hybrid electric vehicle equipped with a parallel-type or transmission-mounted-electric-device (TMED)-type hybrid system, in which an electric motor and an engine clutch (EC) are installed between an engine and a transmission, the output of the engine and the output of the motor may be simultaneously transmitted to a driving shaft.

Typically, in the initial stage of accelerating, a hybrid electric vehicle runs using electric energy (i.e., an electric vehicle (EV) mode). However, there is a limitation to the extent to which the power requested by a driver can be satisfied using only electric energy, and there is thus a need to use an engine as a main power source (i.e., a hybrid electric vehicle (HEV) mode) at certain times. At such times, when the difference between the number of revolutions per minute of the motor and the number of revolutions per minute of the engine is within a predetermined range, the hybrid electric vehicle operates such that an engine clutch is engaged so that the motor and the engine rotate together. The structure of the hybrid electric vehicle will be described below with reference to FIG. 1.

FIG. 1 (RELATED ART) illustrates an exemplary structure of a powertrain of a general hybrid electric vehicle.

Referring to FIG. 1, the powertrain of the hybrid electric vehicle adopts a parallel-type hybrid system, in which an electric motor (or a drive motor) 140 and an engine clutch 130 are installed between an internal combustion engine (ICE) 110 and a transmission 150.

In such a vehicle, when a driver steps on an accelerator after starting (i.e. the accelerator pedal position sensor ON mode), the electric motor 140 is first driven using electric power from a battery in the state in which the engine clutch 130 is open, and then power from the motor is transmitted to the wheels via the transmission 150 and a final drive (FD) 160 in order to rotate the wheels (i.e., an EV mode). When higher driving force is needed as the vehicle is gradually accelerated, an auxiliary motor (or a starter/generator motor) 120 may be operated to drive the engine 110.

When the rotational speeds of the engine 110 and the electric motor 140 become equal, the engine clutch 130 is locked, with the result that both the engine 110 and the electric motor 140 drive the vehicle (i.e., transition from the EV mode to an HEV mode). When a predetermined engine OFF condition is satisfied, for example, when the vehicle is decelerated, the engine clutch 130 is opened, and the engine 110 is stopped (i.e., transition from the HEV mode to the EV mode). At this time, the battery is charged through the electric motor 140 using the driving force of the wheels in the vehicle, which is referred to as recovery of braking energy or regenerative braking. The starter/generator motor 120 acts as a start motor when starting the engine and as a generator after starting the engine, at the time of starting off, or when engine rotation energy is collected. Therefore, the starter/generator motor 120 may be referred to as a "hybrid starter generator (HSG)".

In general, the transmission 150 may be implemented as a manual or automatic transmission or a multi-plate clutch, e.g., a dual-clutch transmission (DCT).

The engine of the hybrid electric vehicle can be turned on and off while traveling due to inherent characteristics of the powertrain of the hybrid electric vehicle, and thus efforts have been made to improve efficiency in various ways, which cannot be achieved by general vehicles with internal combustion engines. One of the ways of improving efficiency is a pulse-and-glide (PnG) traveling mode. The PnG traveling mode is a traveling mode having a periodic acceleration/deceleration pattern, in which acceleration using the power of an engine, coasting in an engine-off state and acceleration using the power of the engine in a speed-reduced state are repeated. Such a PnG traveling mode minimizes energy loss attributable to operation of electrical parts (e.g., an electric motor, an inverter, a battery, etc.) of the powertrain, thus leading to improvement of fuel efficiency.

A detailed explanation of the PnG traveling mode will be made with reference to FIGS. 2 to 3B.

FIG. 2 (RELATED ART) is a view for explaining the PnG traveling mode through comparison with a cruise-control mode in a general hybrid electric vehicle. FIGS. 3A and 3B (RELATED ART) are views showing the distribution of the power of an engine for each traveling mode shown in FIG. 2.

In the graph shown in FIG. 2, the vertical axis represents a vehicle speed, and the horizontal axis represents time. The left region in the graph represents a vehicle speed profile in the cruise-control mode, and the right region in the graph represents a vehicle speed profile in the PnG traveling mode. In each of the graphs shown in FIGS. 3A and 3B, the vertical axis represents engine torque, and the horizontal axis represents an engine speed (i.e., the number of revolutions per minute).

Referring to FIG. 2, in the cruise-control mode, a predetermined cruise vehicle speed is maintained irrespective of engagement with or disengagement from the engine. In the state of engagement with the engine, as shown in FIG. 3A, the engine is driven with a certain operating point in an optimal operating line (OOL), which is formed based on optimal efficiency points including a sweet spot (SS), at which the engine efficiency is the highest. At this time, a portion of the engine output is used for traveling (i.e., speed maintenance), and the remaining portion of the engine output is used to charge the battery. In the state of disengagement from the engine, the engine-off or fuel-cut state is maintained. At this time, the electric motor is driven in order to maintain the cruise vehicle speed using the electric power stored in the battery.

On the other hand, in the PnG traveling mode, the vehicle is accelerated by the power of the engine during a pulse phase, coasts during a glide phase, during which the engine is disengaged from the driving shaft (and is turned off) by opening the engine clutch, and is decelerated by traveling resistance (e.g., air resistance, frictional resistance of the powertrain, rolling resistance, etc.). Specifically, as shown in FIG. 3B, during the pulse phase, the engine is driven with a certain operating point in the optimal operating curve. This operation is similar to that in the cruise-control mode. However, the power is distributed such that a portion thereof is used for traveling (i.e., speed maintenance), and the remaining portion thereof is used for acceleration. In the state of disengagement from the engine, the vehicle coasts without driving the motor and is decelerated.

Therefore, when the powertrain is operated in the PnG traveling mode, the processes of charging and discharging the battery by the electric motor are minimized, which leads not only to a reduction in the amount of energy that is needlessly consumed during the charging and discharging processes but also to an increase in the lifespan of the electrical parts.

Meanwhile, with the recent active development of a vehicle wireless communication (Vehicle-to-Everything (V2X)) technology, there is being developed a platooning technology, in which a group of vehicles can travel very closely together, which is efficient, while exchanging information related to traveling with each other. Generally, a cruise-control mode is performed during vehicle platooning. However, the application of the above-described PnG traveling mode to vehicle platooning may also be considered in order to further improve efficiency.

However, the application of the PnG traveling mode to vehicle platooning may entail the following problems.

Because not all vehicles in the platoon have the same configuration, the optimal operating lines may be different depending on the engines in the vehicles, and accordingly the magnitudes of extra power (which is equal to the difference between the power corresponding to the engine operating point and the power required for speed maintenance), which can be used for acceleration, may be different. This results in a difference in acceleration between the vehicles during the pulse phase. Further, there is a difference in the magnitude between traveling resistance components of the vehicles, and thus there is a difference in deceleration between the vehicles when coasting during the glide phase. For the above reasons, in order to maintain a constant safe distance between the vehicles in the platoon, the engines of the vehicles may be driven inefficiently, or unnecessary braking operations may be performed. For example, during the pulse phase, if the acceleration of the following vehicle is greater than the acceleration of the preceding vehicle, there is a risk of collision between the following vehicle and the preceding vehicle. Thus, in order to prevent a collision, the preceding vehicle may need to make the engine produce a larger output that exceeds its optimal operating point, or the following vehicle may need to reduce the speed using the brake system.

SUMMARY

Accordingly, the present disclosure is directed to a hybrid electric vehicle and a platooning control method therefor capable of maximizing energy efficiency during platooning.

An object of the present disclosure is to provide a method of enabling a hybrid electric vehicle to more efficiently travel in a pulse-and-glide traveling mode according to its traveling circumstances and a vehicle for performing the method.

Another object of the present disclosure is to provide a method of realizing a pulse-and-glide traveling mode while preventing unnecessary engine operation or braking during vehicle platooning and a vehicle for performing the method.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a platooning control method for a hybrid electric vehicle includes acquiring, by a wireless communication unit, acceleration information and deceleration information of each of a plurality of vehicles traveling in a platoon form for platooning so as to realize a pulse-and-gliding traveling mode, determining, by a hybrid control unit, a traveling order of the vehicles during the platooning based on the acceleration information, and determining, by the hybrid control unit, a time at which to start a glide phase of a following vehicle in the determined traveling order based on a time at which a glide phase of a preceding vehicle starts using the acceleration information and the deceleration information.

In another aspect of the present disclosure, a non-transitory computer-readable recording medium containing program instructions executed by a processor includes: program instructions that acquire acceleration information and deceleration information of each of a plurality of vehicles traveling in a platoon form for platooning so as to realize a pulse-and-gliding traveling mode; program instructions that determine a traveling order of the vehicles during the platooning based on the acceleration information; and program instructions that determine a time at which to start a glide phase of a following vehicle in the determined traveling order based on a time at which a glide phase of a preceding vehicle starts using the acceleration information and the deceleration information.

In a further aspect of the present disclosure, a hybrid electric vehicle for platooning includes a wireless communication unit for acquiring acceleration information and deceleration information of each of a plurality of vehicles traveling in a platoon form for platooning so as to realize a pulse-and-gliding traveling mode, and a hybrid control unit for determining the traveling order of the vehicles during the platooning based on the acceleration information and determining the time at which to start a glide phase of a following vehicle in the determined traveling order based on the time at which a glide phase of a preceding vehicle starts using the acceleration information and the deceleration information.

It is to be understood that both the preceding general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Figure 1:
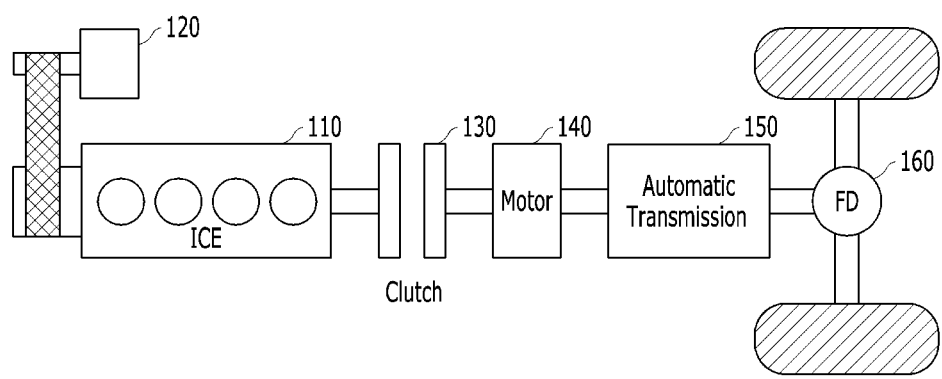
FIG. 1 (RELATED ART) is a view showing an example of a powertrain structure of a general hybrid electric vehicle.
Figure 2:
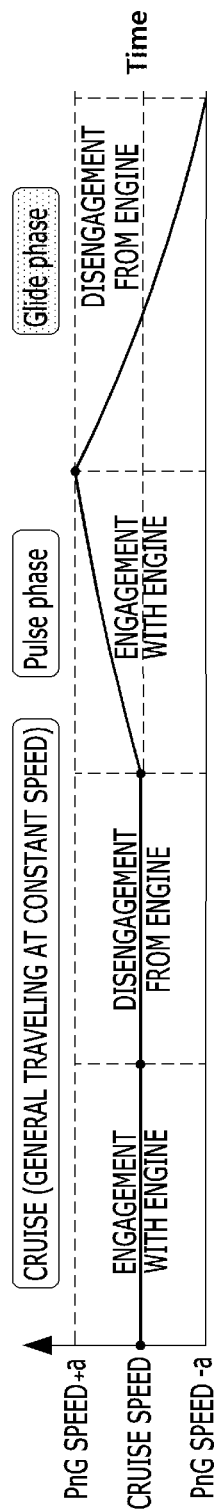
FIG. 2 (RELATED ART) is a view for explaining a pulse-and-glide traveling mode through comparison with a cruise-control mode in a general hybrid electric vehicle.
Figure 3A:
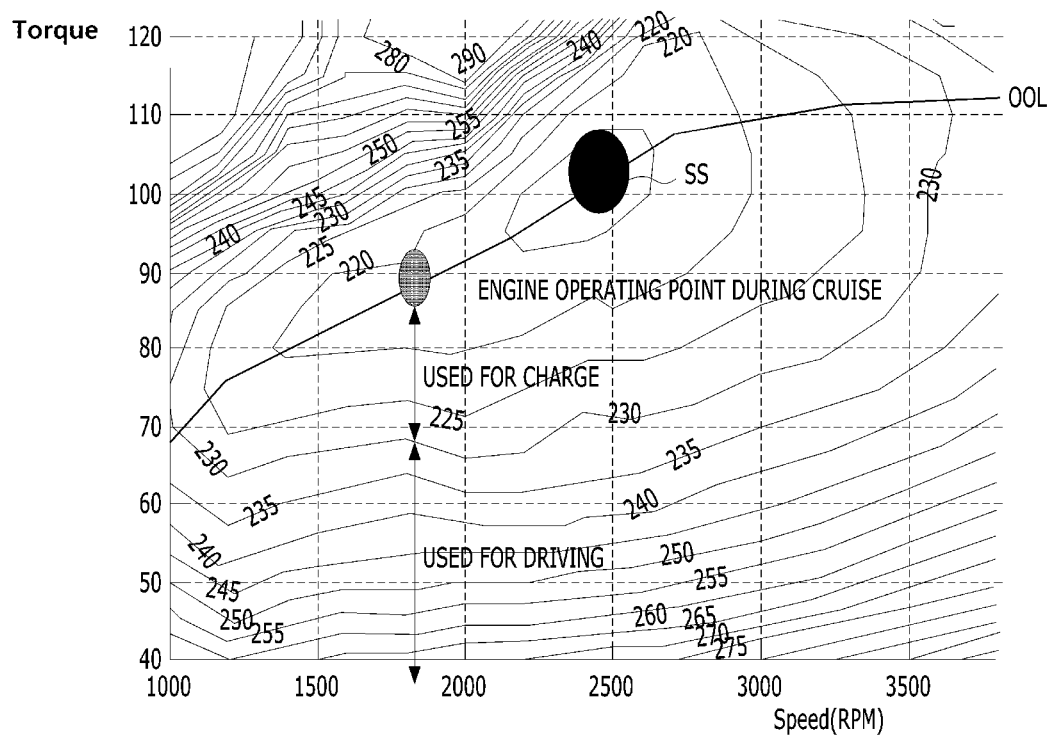
FIGS. 3A and 3B (RELATED ART) are views showing the distribution of power of an engine for each traveling mode shown in FIG. 2.
Figure 3B:
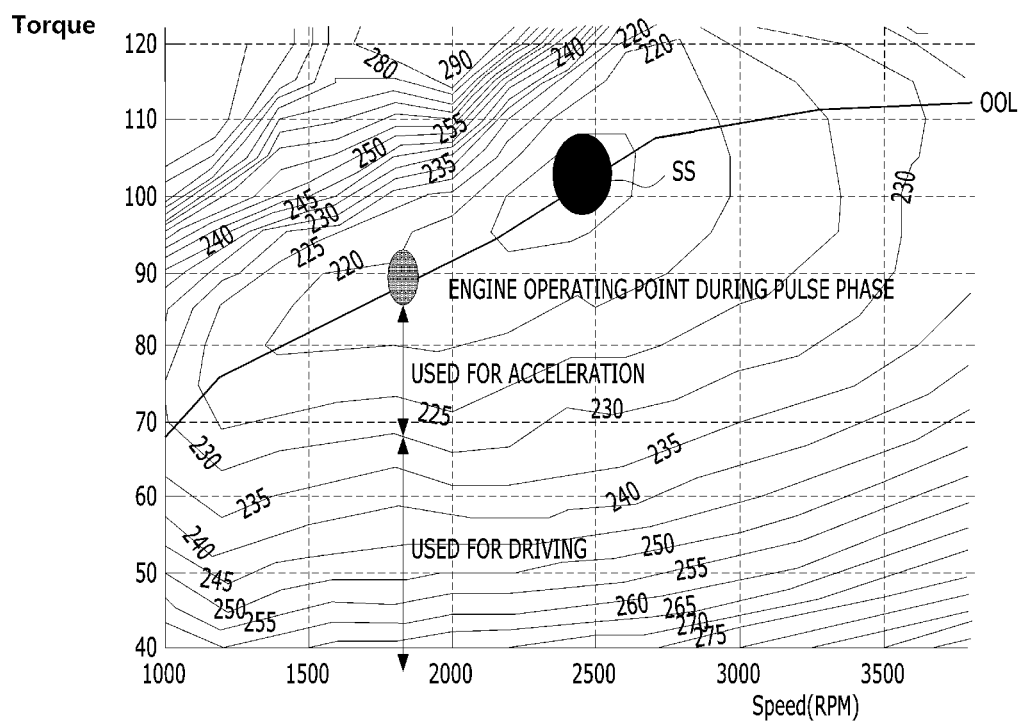

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Reference will now be made in detail to the preferred embodiments of the present disclosure, examples of which are illustrated in the accompanying drawings. However, it will be understood that the present disclosure should not be limited to the embodiments and may be modified in various ways. In the drawings, to clearly and briefly explain the present disclosure, an illustration of elements having no connection with the description is omitted, and the same or extremely similar elements are designated by the same reference numerals throughout the specification.

Throughout the specification, when an element is referred to as "including" another element, the element should not be understood as excluding other elements so long as there is no special conflicting description, and the element may include at least one other element. Wherever possible, the same reference numbers will be used throughout the drawings to refer to the same or like parts.

Prior to describing a method of controlling a hybrid electric vehicle according to an embodiment of the present disclosure, the relationships between control units of the powertrain that are applicable to the embodiment will be described with reference to FIG. 4. The construction shown in FIG. 4 may be applied to a hybrid electric vehicle having the powertrain described above with reference to FIG. 1.

Figure 4:
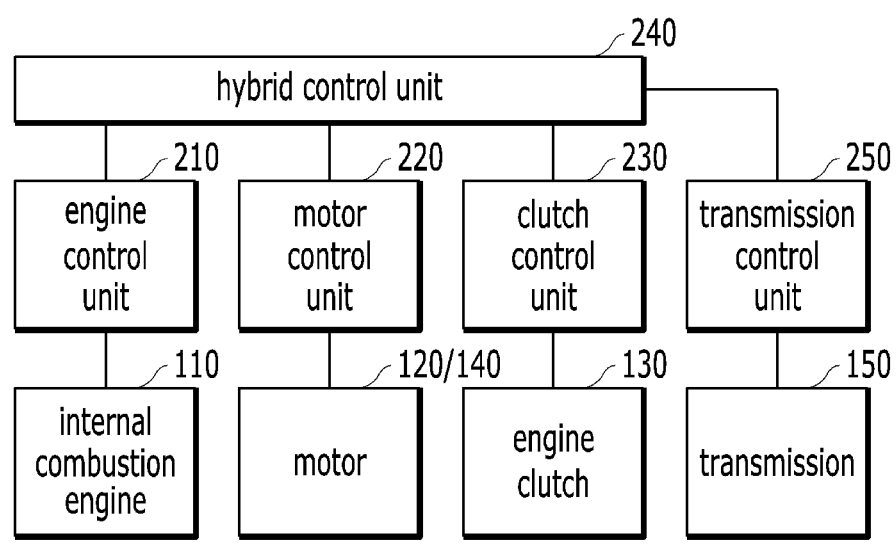
FIG. 4 is a block diagram showing an example of a control system of a hybrid electric vehicle that is applicable to an embodiment of the present disclosure.

FIG. 4 is a block diagram showing an example of a control system of the hybrid electric vehicle that is applicable to an embodiment of the present disclosure.

Referring to FIG. 4, in the hybrid electric vehicle to which embodiments of the present invention are applicable, the internal combustion engine 110 may be controlled by an engine control unit 210, the torque of the starter/generator motor 120 and the electric motor 140 may be controlled by a motor control unit (MCU) 220, and the engine clutch 130 may be controlled by a clutch control unit 230. The engine control unit 210 may also be referred to as an engine management system (EMS). In addition, the transmission 150 is controlled by a transmission control unit 250. Depending on the circumstances, the starter/generator motor 120 and the electric motor 140 may be controlled by different motor control units.

Each control unit may be connected to a hybrid control unit (HCU) 240, which is a higher-level controller that controls an overall mode-switching process. Under the control of the hybrid control unit 240, each control unit may provide information necessary for engine clutch control at the time of switching traveling modes or shifting gears and/or information necessary for engine stop control to the hybrid control unit 240, or may perform an operation in response to a control signal from the hybrid control unit 240.

In particular, the hybrid control unit 240 determines whether to perform mode switching based on the traveling state of the vehicle. For example, the hybrid control unit 240 may determine the open time of the engine clutch 130, and when the engine clutch 130 is opened, may perform hydraulic control (for a wet-type engine clutch) or torque capacity control (for a dry-type engine clutch). In addition, the hybrid control unit 240 may determine the state (lockup, slip, or open) of the engine clutch 130, and may control the time at which to interrupt the injection of fuel into the engine 110. In addition, the hybrid control unit 240 may transmit a torque command for controlling the torque of the starter/generator motor 120 in order to perform engine stop control to the motor control unit 220, whereby it is possible to control the collection of engine rotation energy. Further, the hybrid control unit 240 may calculate current driver demand torque using the value of an accelerator position sensor (APS) and the value of a brake pedal position sensor (BPS), and may calculate demand torque corresponding to a virtual APS signal when a speed limit control system is activated.

Of course, it will be obvious to those skilled in the art that the relationships between the control units and the functions/classification of the control units are illustrative, and not restricted by the names thereof. For example, the hybrid control unit 240 may be configured such that one of the other control units excluding the hybrid control unit 240 provides the corresponding function or such that two or more thereof provide the corresponding function in a distributed fashion. Further, although not illustrated, the hybrid electric vehicle may further include a control unit that can perform Vehicle-to-Everything (V2X)-based wireless communication. Examples of this control unit include an audio-video-navigation (AVN) control unit equipped with a wireless communication module, a telematics control unit, etc. However, the present disclosure is not limited thereto.

Hereinafter, a platooning control method for a hybrid electric vehicle according to an embodiment of the present disclosure will be described with reference to a vehicle having the above-described construction.

An embodiment of the present disclosure, so as to realize an efficient pulse-and-glide (PnG) traveling mode during vehicle platooning, proposes a control method including a step of determining the acceleration/deceleration characteristics of each of the vehicles in the platoon and a step of determining the traveling order and acceleration/deceleration intervals of each vehicle during vehicle platooning based on the result of determining the acceleration/deceleration characteristics.

In an aspect of this embodiment, in order to determine the acceleration/deceleration characteristics of each vehicle, the equivalent rotational inertia of each vehicle may be determined using torque corresponding to the optimal operating line (OOL) set by the characteristics of the vehicle and the engine, traveling load torque that is used for speed maintenance, and coasting torque at the time of coasting of the vehicle, and the acceleration and the deceleration of each vehicle may be calculated based on the result of determining the equivalent rotational inertia.

In addition, in an aspect of this embodiment, the acceleration and the deceleration of each vehicle may be calculated based on the angular acceleration and the angular deceleration of the engine.

In addition, in an aspect of this embodiment, the traveling order of the vehicles in the platoon may be determined by comparing the acceleration and the deceleration of one vehicle with those of the other vehicles.

In addition, in an aspect of this embodiment, in the determination of a pulse phase and a glide phase, on the basis of the time at which to start the glide phase of a preceding vehicle, the time at which to start the glide phase of the following vehicle may be determined in the manner of extending the pulse phase of the following vehicle.

In addition, in an aspect of this embodiment, the determination of the traveling order and the time at which to start the phase may be performed in at least one of the vehicles in the platoon, or may be performed in an external apparatus (e.g. a telematics center, a service server, etc.), rather than in the vehicle.

Hereinafter, a detailed description of platooning according to an embodiment will be made with reference to FIG. 5.

Figure 5:
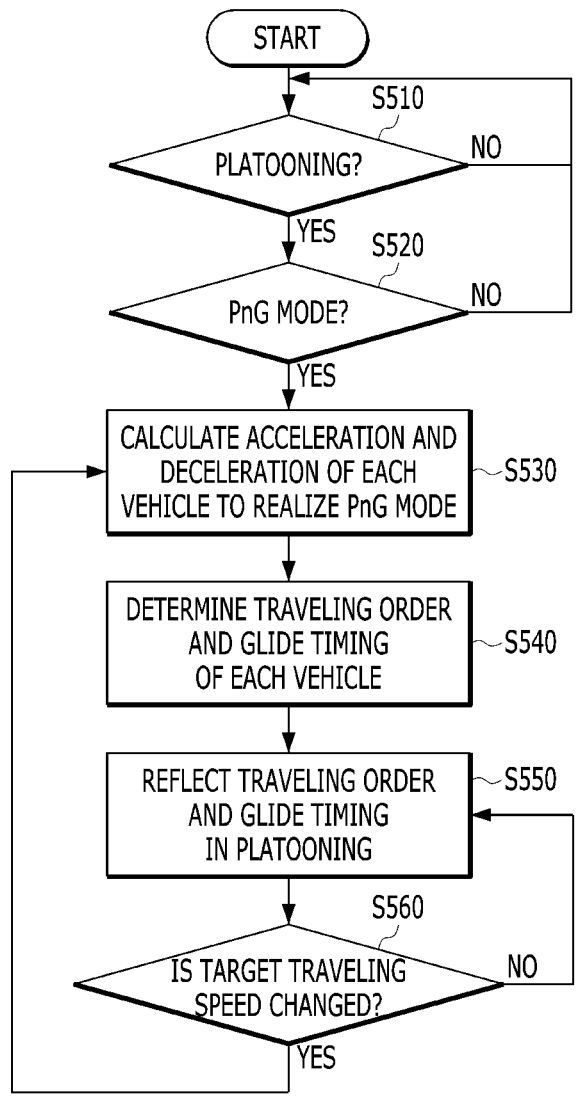
FIG. 5 is a flowchart showing an example of a process of realizing vehicle platooning in which hybrid electric vehicles according to an embodiment of the present disclosure travel efficiently in a platoon form using a pulse-and-glide traveling mode.

FIG. 5 is a flowchart showing an example of the process of realizing vehicle platooning in which the hybrid electric vehicles according to an embodiment of the present disclosure travel efficiently in a platoon form using a pulse-and-glide traveling mode.

Referring to FIG. 5, when it is determined that a platooning operation is performed (S510), a determination may be made as to whether the pulse-and-glide (PnG) traveling mode is being executed (S520). At this time, when it is determined that the PnG traveling mode is being executed, this may mean the situation in which a target traveling speed (e.g. an average speed or an intermediate speed between the maximum speed in the pulse phase and the minimum speed in the glide phase) of each of the vehicles in the platoon has been determined.

When it is determined that the PnG traveling mode is being executed during the platooning, the acceleration and the deceleration of each vehicle may be calculated (S530), and the traveling order of the vehicles and the time at which to start the glide phase may be determined based on the calculation result (S540). As described above, the calculation of the acceleration and the deceleration and the determination of the traveling order and the time at which to start the glide phase may be performed in at least one of the vehicles in the platoon, or may be performed in an external apparatus such as, for example, a telematics center. The information about the determined traveling order and the determined time at which to start the glide phase may be transmitted to each of the vehicles in the platoon from the entity performing the calculating/determining in a wireless manner.

When the traveling order and the time at which to start the glide phase are transmitted to each of the vehicles, the vehicles may start the platooning based on the same (S550). At this time, the time at which to start the glide phase of the following vehicle may be set by adding an offset to the time at which the glide phase of the preceding vehicle starts after the traveling order is completely reflected in the platooning. Further, whether the traveling order is completely reflected in the platooning may be determined when the vehicles sense the relative locations of the other vehicles through the V2X communication, or may be determined in response to a signal input by a driver of any one of the vehicles. An external apparatus such as, for example, a telematics center, may provide the preceding vehicle with the information about the time at which to start the glide phase.

In the case in which the target traveling speed is changed (S560), the process may go back to the step of calculating the acceleration and the deceleration of each vehicle (S530).

Figure 6:
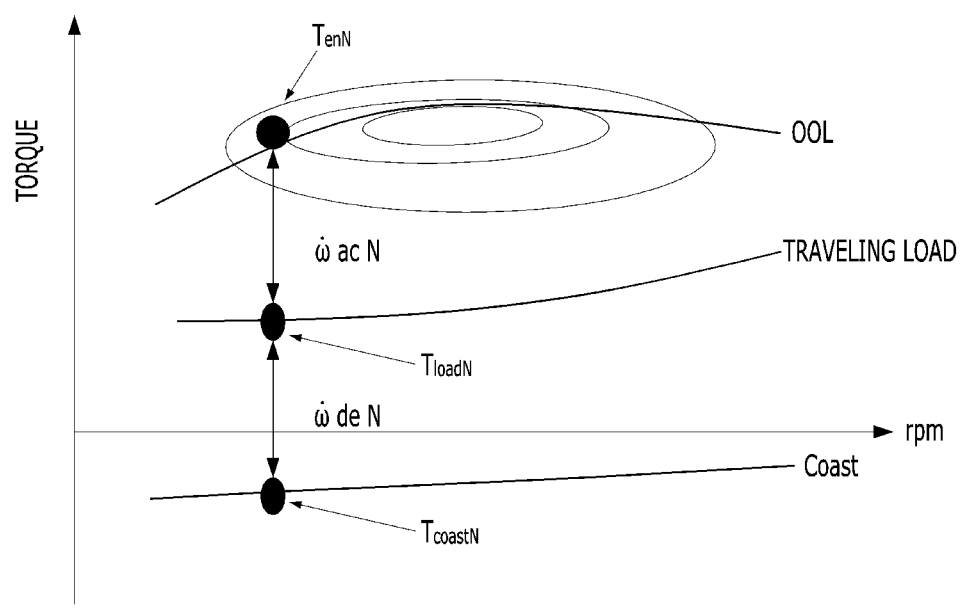
FIG. 6 is a view showing an example of a distribution of engine torque to explain a process of calculating acceleration and deceleration of each vehicle based on engine torque according to an embodiment of the present disclosure.

Hereinafter, the method of calculating the acceleration and the deceleration of each vehicle will be described with reference to FIG. 6. FIG. 6 is a view showing an example of the distribution of the engine torque to explain the process of calculating the acceleration and the deceleration of each vehicle based on the engine torque according to an embodiment of the present disclosure.

Referring to FIG. 6, in the case in which the number of vehicles in the platoon is N (where N>1), the engine torque of the $N^{th}$ vehicle from the back corresponds to a certain point $T_{enN}$ in the optimal operating line (OOL). Further, the traveling load torque $T_{loadN}$ and the coasting torque $T_{coastN}$ are located in the traveling load line and the coasting load line, respectively, so as to have the same number of revolutions per minute (RPM) as the engine operating point.

Using the respective torques shown in FIG. 6 and the equivalent rotational inertia of the vehicle, the angular acceleration and the angular deceleration with respect to the engine of the corresponding vehicle may be calculated. In the vehicle, while performing the rotating movement, the engine must overcome inertia generated by the linear movement of the vehicle. At this time, the value calculated by converting the inertia of the vehicle body into a value pertaining to the rotating shaft of the engine is the aforementioned equivalent rotational inertia. The equivalent rotational inertia JvN of the $N^{th}$ vehicle may be derived from Equation 1 below.

$$JvN = mN * (R_{tireN}^2)/rN^2 \quad \text{[Equation 1]}$$

In Equation 1, mN represents the weight of the $N^{th}$ vehicle, $R_{tireN}$ represents the dynamic radius of the wheel of the $N^{th}$ vehicle, and rN represents the gear ratio of the $N^{th}$ vehicle.

The angular acceleration $\omega_{acN}$ and the angular deceleration $\omega_{deN}$ of the engine of the $N_{th}$ vehicle may be derived from Equation 2 and Equation 3 below, respectively.

$$\omega_{acN} = (T_{enN} - T_{loadN})/JvN \quad \text{[Equation 2]}$$

$$\omega_{deN} = (T_{coastN} - T_{loadN})/JvN \quad \text{[Equation 3]}$$

That is, the angular acceleration $\omega_{acN}$ of the engine is a value calculated by dividing the difference between the engine torque and the traveling load torque by the equivalent rotational inertia, and the angular deceleration WdeN of the engine is a value calculated by dividing the difference between the coasting torque and the traveling load torque by the equivalent rotational inertia.

After the angular acceleration $\omega_{acN}$ and the angular deceleration $\omega_{deN}$ of the engine of the $N^{th}$ vehicle are derived as described above, the acceleration $a_{acN}$ and the deceleration $a_{deN}$ of the $N^{th}$ vehicle may be derived from Equation 4 and Equation 5 below, respectively.

$$a_{acN} = (R_{tireN} * \omega_{acN})/rN \quad \text{[Equation 4]}$$

$$a_{deN} = (R_{tireN} * \omega_{deN})/rN \quad \text{[Equation 5]}$$

After the acceleration and the deceleration of each of the vehicles are derived as described above, the traveling order of the vehicles may be determined in order of highest to lowest acceleration such that the vehicle with the highest acceleration becomes a leader vehicle. The determination of the time at which to change to the glide phase will be described with reference to FIG. 7.

Figure 7:
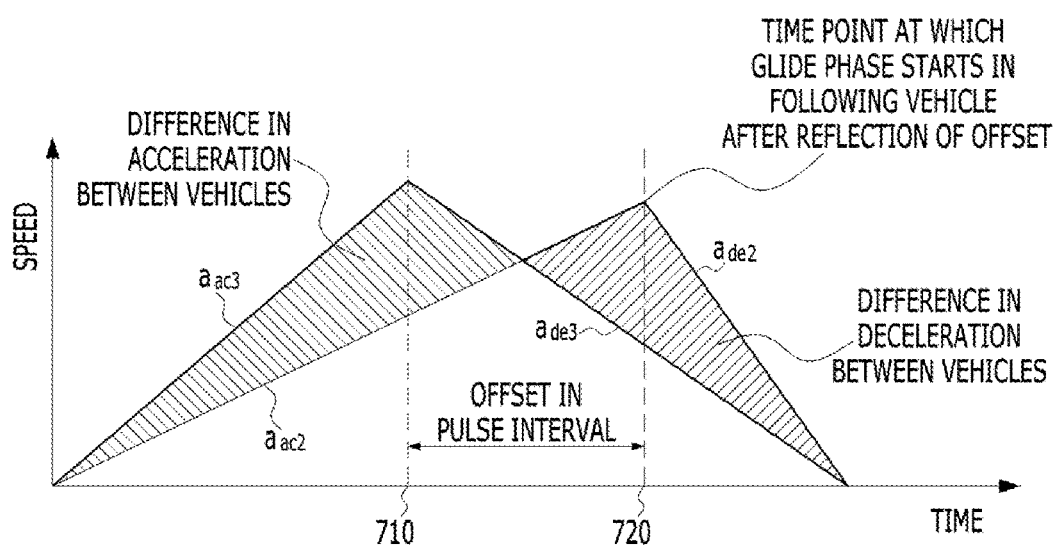
FIG. 7 is a view showing an example of a method of determining a time at which to start a glide phase using the acceleration and the deceleration of each vehicle according to an embodiment of the present disclosure.

FIG. 7 is a view showing an example of a method of determining the time at which to start the glide phase using the acceleration and the deceleration of each vehicle according to an embodiment of the present disclosure. It is assumed in FIG. 7 that three vehicles are traveling in a platoon form and that the traveling order thereof has already been determined according to the acceleration. In the relationships between the intermediate vehicle (i.e., N=2) and the leader vehicle (i.e., N=3), the process of determining the time at which to start the glide phase of the intermediate vehicle based on the time at which the glide phase of the leader vehicle starts will now be described.

In the graph shown in FIG. 7, the horizontal axis represents time, and the vertical axis represents speed. The method of determining the time at which to change to the glide phase of the vehicles that are traveling in the traveling order determined according to the magnitude of the acceleration is as follows.

The time at which to start the glide phase of the following vehicle (N=2) may be determined in the manner of extending the pulse interval of the following vehicle by the time difference (offset) between the time point 710 at which the glide phase of the preceding vehicle (N=3) starts (i.e., the time point at which $a_{ac3}$ is changed to $a_{de3}$) and the time point 720 at which the difference in deceleration between the preceding vehicle and the following vehicle becomes equal to the difference in acceleration therebetween, measured at the time point 710.

After the above-described process is performed on the leader vehicle (N=3) and the intermediate vehicle (N=2), it may be additionally performed on the intermediate vehicle (N=2) and the last vehicle (N=1) while regarding the intermediate vehicle as the preceding vehicle.

After the traveling order of the vehicles in the platoon is determined through the above-described method, the time at which to start the glide phase of each of the vehicles may be determined in the manner of adding the offset to the pulse phase of the following vehicle in sequence from the leader vehicle to the last vehicle.

In vehicle platooning described until now, the determination of the traveling order and the time at which to start the glide phase may be performed in an external apparatus, or may be performed in the vehicle, as has been described above. The traveling scenarios according to an embodiment in each of these two cases are as follows.

CASE 1: the case in which a determination is made by a vehicle data center (a server or a telematics center).

1. The hybrid control unit of each vehicle transmits information about the acceleration and the deceleration necessary for the pulse-and-glide (PnG) traveling mode to the vehicle data center through a wireless communication module.

2. The vehicle data center performs comparison between the angular acceleration and the angular deceleration for the PnG traveling of each vehicle, determines the traveling order such that the vehicle with the highest angular acceleration becomes the leader vehicle, and determines the time at which to start the glide phase in consideration of deceleration to maintain a constant distance between the vehicles.

3. The vehicle data center transmits information about the traveling order and the time at which to start the glide phase to each of the vehicles in the platoon.

4. During the platooning, the vehicles change the positions thereof in the platoon according to the traveling order transmitted thereto. At this time, the change in the positions of the vehicles in the platoon may be performed in an autonomous traveling manner, which is associated with advanced driver assistance systems (ADAS), corresponding to the information about the order contained in the hybrid control unit, or may be performed by driver intervention. When the positions of the vehicles are completely changed, the hybrid control unit starts the pulse-and-glide (PnG) traveling mode, corresponding to the time at which to start the glide phase in each of the vehicles.

5. In the case in which the traveling order of the vehicles traveling in the PnG traveling mode is changed due to a change in vehicle speed or a change in traveling circumstances during the platooning, the vehicle data center may transmit new information about the traveling order and the time at which to change the phases to the vehicles.

CASE 2: the case in which a determination is made by the vehicle

1. The hybrid control unit of each of the vehicles shares the information about the acceleration and the deceleration necessary for the PnG traveling of each of the vehicles with the hybrid control units of the other vehicles through communication between the vehicles in the platoon.

2. The hybrid control unit of each of the vehicles compares the acceleration and the deceleration necessary for the PnG traveling of every vehicle, the information about which is transmitted thereto through the communication between the vehicles in the platoon. Through the communication between the vehicles, the traveling order of the vehicles is determined in order of acceleration such that the vehicle with the highest acceleration travels as the leader vehicle, and the time at which to start the glide phase is also calculated.

3. In the case in which the traveling order of the vehicles is changed due to a change in the acceleration and the deceleration necessary for the PnG traveling of each of the vehicles attributable to a change in vehicle speed or a change in traveling circumstances during the platooning, the hybrid control units of the vehicles may share new information about the traveling order and the time at which to change the phases and may reflect the same in the platooning through the communication between the vehicles.

The disclosure described above may be implemented as computer-readable code in a medium in which a program is recorded. Computer-readable recording media include all kinds of recording devices in which data readable by computer systems is stored. The computer-readable recording media include a Hard Disk Drive (HDD), a Solid State Drive (SSD), a Silicon Disk Drive (SDD), a ROM, a RAM, a CD-ROM, a magnetic tape, a floppy disk, an optical data storage system, etc.

As is apparent from the above description, a hybrid electric vehicle according to at least one embodiment of the present disclosure configured as described above can more efficiently travel in a pulse-and-glide traveling mode during platooning.

Particularly, since the traveling order of the vehicles in the platoon is determined based on the acceleration and the deceleration of each vehicle, unnecessary engine operation or braking for maintaining a distance between the vehicles is prevented, thus improving efficiency.

It will be appreciated by those skilled in the art that the effects achievable through the present disclosure are not limited to those that have been specifically described hereinabove, and other effects of the present disclosure will be more clearly understood from the above detailed description.

The above detailed description is not to be construed as limiting the present disclosure in any aspect, and is to be considered by way of example. The scope of the present disclosure should be determined by reasonable interpretation of the accompanying claims, and all equivalent modifications made without departing from the present disclosure should be included in the following claims.

What is claimed is:

1. A platooning control method for a hybrid electric vehicle, the method comprising:
   acquiring, by a wireless communication unit, acceleration information and deceleration information of each of a plurality of vehicles traveling in a platoon form for platooning so as to realize a pulse-and-gliding traveling mode;
   determining, by a hybrid control unit, a traveling order of the vehicles during the platooning based on the acceleration information; and
   determining, by the hybrid control unit, a time at which to start a glide phase of a following vehicle in the determined traveling order based on a time at which a glide phase of a preceding vehicle starts using the acceleration information and the deceleration information.

2. The platooning control method according to claim 1, wherein the acceleration information and the deceleration information of each of the plurality of vehicles are calculated based on angular acceleration and angular deceleration of an engine of a corresponding vehicle.

3. The platooning control method according to claim 2, wherein the angular acceleration and the angular deceleration of the engine are calculated based on engine torque in an optimal operating line, traveling load torque and coasting torque corresponding to the engine torque, and equivalent rotational inertia.

4. The platooning control method according to claim 3, wherein the equivalent rotational inertia is calculated based on a weight, a dynamic radius of a wheel and a gear ratio of the corresponding vehicle.

5. The platooning control method according to claim 1, wherein determining the traveling order of the vehicles during the platooning based on the acceleration information comprises determining the traveling order of the vehicles in order of highest to lowest acceleration.

6. The platooning control method according to claim 1, wherein determining the time at which to start the glide phase of the following vehicle comprises extending a pulse phase of the following vehicle by an offset between the time at which the glide phase of the preceding vehicle starts and a time at which a difference in deceleration between the preceding vehicle and the following vehicle becomes equal to a difference in acceleration therebetween.

7. The platooning control method according to claim 1, further comprising:
   transmitting information about the determined traveling order and the determined time at which to start the glide phase to each of the plurality of vehicles.

8. The platooning control method according to claim 7, further comprising:
   when traveling positions of the plurality of vehicles are changed according to the information about the determined traveling order, starting the pulse-and-glide traveling mode, corresponding to the time at which to start the glide phase in each of the plurality of vehicles.

9. The platooning control method according to claim 1, further comprising:
   when a target speed or traveling circumstances of the platooning are changed, re-determining the traveling order and the time at which to start the glide phase.

10. A non-transitory computer-readable recording medium containing program instructions executed by a processor, the computer readable medium comprising:
    program instructions that acquire acceleration information and deceleration information of each of a plurality of vehicles traveling in a platoon form for platooning so as to realize a pulse-and-gliding traveling mode;
    program instructions that determine a traveling order of the vehicles during the platooning based on the acceleration information; and
    program instructions that determine a time at which to start a glide phase of a following vehicle in the determined traveling order based on a time at which a glide phase of a preceding vehicle starts using the acceleration information and the deceleration information.

11. A hybrid electric vehicle for platooning, comprising:
a wireless communication unit for acquiring acceleration information and deceleration information of each of a plurality of vehicles traveling in a platoon form for platooning so as to realize a pulse-and-gliding traveling mode; and
a hybrid control unit for determining a traveling order of the vehicles during the platooning based on the acceleration information and determining a time at which to start a glide phase of a following vehicle in the determined traveling order based on a time at which a glide phase of a preceding vehicle starts using the acceleration information and the deceleration information.

12. The hybrid electric vehicle according to claim 11, wherein the acceleration information and the deceleration information of each of the plurality of vehicles are calculated based on angular acceleration and angular deceleration of an engine of a corresponding vehicle.

13. The hybrid electric vehicle according to claim 12, wherein the angular acceleration and the angular deceleration of the engine are calculated based on engine torque in an optimal operating line, traveling load torque and coasting torque corresponding to the engine torque, and equivalent rotational inertia.

14. The hybrid electric vehicle according to claim 13, wherein the equivalent rotational inertia is calculated based on a weight, a dynamic radius of a wheel and a gear ratio of the corresponding vehicle.

15. The hybrid electric vehicle according to claim 11, wherein the hybrid control unit determines the traveling order of the vehicles in order of highest to lowest acceleration.

16. The hybrid electric vehicle according to claim 11, wherein the hybrid control unit extends a pulse phase of the following vehicle by an offset between the time at which the glide phase of the preceding vehicle starts and a time at which a difference in deceleration between the preceding vehicle and the following vehicle becomes equal to a difference in acceleration therebetween.

17. The hybrid electric vehicle according to claim 11, wherein the hybrid control unit transmits information about the determined traveling order and the determined time at which to start the glide phase to each of the plurality of vehicles.

18. The hybrid electric vehicle according to claim 17, wherein when traveling positions of the plurality of vehicles are changed according to the information about the determined traveling order, the hybrid control unit performs control so as to start the pulse-and-glide traveling mode, corresponding to the time at which to start the glide phase in a corresponding vehicle.

19. The hybrid electric vehicle according to claim 11, wherein when a target speed or traveling circumstances of the platooning are changed, the hybrid control unit re-determines the traveling order and the time at which to start the glide phase.

* * * * *